United States Patent
Jang

(10) Patent No.: US 7,251,240 B2
(45) Date of Patent: Jul. 31, 2007

(54) METHOD FOR TRANSMITTING DATA AND COMPENSATING FOR PROPAGATION DELAY IN POINT-TO-MULTIPOINT DATA COMMUNICATION NETWORK

(75) Inventor: Kyung-hun Jang, Kyungki-do (KR)

(73) Assignee: Samsung Electronics Co., Ltd., Suwon, Kyungki-do (KR)

(*) Notice: Subject to any disclaimer, the term of this patent is extended or adjusted under 35 U.S.C. 154(b) by 1031 days.

(21) Appl. No.: 10/185,066

(22) Filed: Jul. 1, 2002

(65) Prior Publication Data

US 2003/0039273 A1   Feb. 27, 2003

(30) Foreign Application Priority Data

Aug. 23, 2001 (KR) ............................... 2001-51007

(51) Int. Cl.
  *H04J 3/06*   (2006.01)
(52) U.S. Cl. ...................................... 370/350; 370/508
(58) Field of Classification Search ................ 370/255, 370/345, 350, 458, 508, 519
  See application file for complete search history.

(56) References Cited

U.S. PATENT DOCUMENTS

| 6,643,295 | B1* | 11/2003 | Nose .......................... 370/442 |
| 6,956,865 | B1* | 10/2005 | Khaunte et al. ............ 370/442 |
| 2002/0093935 | A1* | 7/2002 | Denney et al. ............. 370/347 |
| 2004/0244044 | A1* | 12/2004 | Brommer ................... 725/111 |

FOREIGN PATENT DOCUMENTS

| CN | 1121296 A | 4/1996 |
| EP | 1 107 477 A | 6/2001 |
| JP | 4181837 | 6/1992 |
| JP | 9162911 | 6/1997 |
| WO | WO 01/37494 | 5/2001 |
| WO | WO 01/56180 | 8/2001 |

OTHER PUBLICATIONS

Japanese Office Action issued Jun. 1, 2005, P30714/197499/ 17-6-1.

* cited by examiner

*Primary Examiner*—Melvin Marcelo
(74) *Attorney, Agent, or Firm*—Buchanan Ingersoll & Rooney PC

(57) ABSTRACT

The method for transmitting data in a point-to-multipoint data communication network which includes a network access point and a first through an $N^{th}$ (N is 2 or a higher positive integer) station that communicate each other through a shared transmission medium, the data transmission method, wherein the station determines time to transmit its data to the network access point based on time when the station receives transmission timing information from the network access point. A propagation delay compensation method in this type of network in case transmission timing information of an upstream channel for station that receives connection ID from the network access point is set, the method includes (a) transmitting a map message, which includes a maximum propagation delay time and an offset time, as the transmission timing information, (b) transmitting data after the offset time passes from time the transmitted map message is received, and (c) forecasting an actual propagation delay time by reflecting gap between actual time the transmitted data is received and expected time the transmitted data is expected to be received, and the forecasted delay time and the offset time update the map message.

8 Claims, 2 Drawing Sheets

METHOD FOR TRANSMITTING DATA AND COMPENSATING FOR PROPAGATION DELAY IN POINT-TO-MULTIPOINT DATA COMMUNICATION NETWORK

Priority is claimed to Patent Application Number 2001-51007 filed in Rep. of Korea on Aug. 23, 2001, herein incorporated by reference.

BACKGROUND OF THE INVENTION

1. Field of the Invention

The present invention relates to a point-to-multipoint data communication network, and more particularly, to a method for transmitting data and compensating for a propagation delay in a point-to-multipoint data communication network.

2. Description of the Related Art

Point-to-multipoint data communication networks sharing transmission media include a Hybrid Fiber & Coaxial (HFC) network using a cable modem, and a Broadband Wireless Local Loop (B-WLL) network that is a wireless access network. Downstream refers to a data transmission direction from a network access point to stations while upstream refers to a data transmission direction from stations to the network access point. In a point-to-multipoint data communication network, a downstream channel transmits data through broadcast and an upstream channel transmits data by sharing media under the control of the network access point. Especially, the upstream channel transmits data at a predetermined time using a specific protocol for an effective access to media. For the timely transmission of data, stations need to be correctly synchronized with the network access point in a network.

The point-to-multipoint data communication network includes the network access point and multiple stations. The network access point broadcasts a time information message to stations periodically so that they can be synchronized with the network access point. After receiving the broadcasted time information message, the stations synchronize the time of their own timers with that of the network access point. In addition, since the propagation delay between the network access point and stations are compensated for in the ranging process, the network access point can transmit and receive data accurately at a desired time. To maximize the utilization efficiency of shared media, the network access point calculates transmission timing of each station by means of scheduling based on various parameters related to each station, prepares transmission/receiving timing information for media access and broadcasts the prepared transmission/receiving timing information to each station by transmission frame. Upon receiving the transmission/receiving timing information, each station sends data to the network access point at the time of summing an offset time and an allocation start time included in the transmission timing information.

According to the conventional methods for transmitting data and compensating for a propagation delay, to maintain and adjust the network synchronization for determination of an accurate transmission timing, the network access point should broadcast a synchronization (SYNC) message periodically to stations. In addition, a ranging message should be exchanged periodically in order to compensate a delay due to the propagation distance between the network access point and stations, resulting in a high overhead. Therefore, since media were not totally used to transmit data, the entire transmission capacity was impacted.

SUMMARY OF THE INVENTION

To solve the above-described problems, it is a first object of the present invention to provide a method for transmitting data in a point-to-multipoint data communication network without the need for synchronizing stations with a network access point.

It is a second object of the present invention to provide a method for compensating for a propagation delay due to the distance between a network access point and stations in a point-to-multipoint data communication network without the need for exchanging a ranging message.

Accordingly, to achieve the first object, there is provided a method for transmitting data in a point-to-multipoint data communication network which includes a network access point and a first through an $N^{th}$ (N is 2 or a higher positive integer) station that communicate with each other through a shared transmission medium, wherein the station determines a time to transmit its data to the network access point based on a time when the station receives transmission timing information from the network access point.

In order to achieve the second object, there is provided, in a point-to-multipoint data communication network which includes a network access point and a first through an $N^{th}$ (N is 2 or a higher positive integer) station that communicate with each other through a shared transmission medium, a propagation delay compensation method in case transmission timing information of an upstream channel for a station that receives a connection ID from the network access point is set. The method includes (a) transmitting a map message, which includes a maximum propagation delay time and an offset time, as the transmission timing information, (b) transmitting data after the offset time passes from time the transmitted map message is received, and (c) forecasting an actual propagation delay time by reflecting gap between actual time the transmitted data is received and expected time the transmitted data is expected to be received, and the forecasted delay time and the offset time update the map message.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

The present invention will now be described in detail by describing preferred embodiments thereof with reference to the accompanying drawings.

Figure 1:
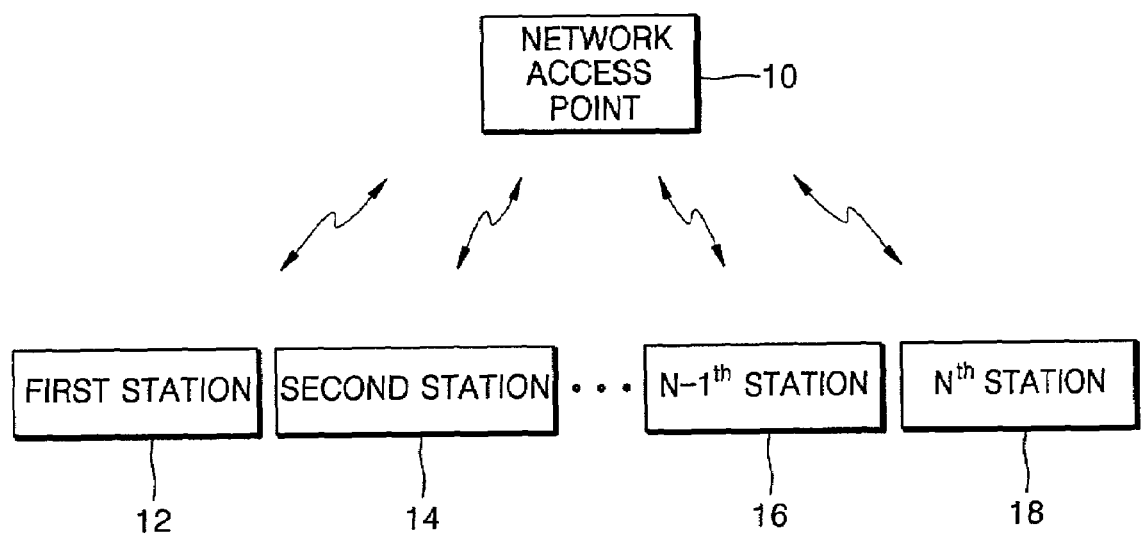
FIG. 1 shows a point-to-multipoint data communication network.

FIG. 1 shows a point-to-multipoint data communication network which includes a network access point 10 and a first through an $N^{th}$ station (12, 14, ..., 16 and 18). Here, N is 2 or a higher positive integer. The network access point 10 shown in FIG. 1 communicates with the first through the $N^{th}$ station (12, 14, ..., 16 and 18) through a shared transmission medium in a wired or a wireless way. According to a conventional method for transmitting data, the network access point 10 broadcasted a synchronization message to stations (12, 14, ..., 16 and 18) periodically. However, as for a data transmission method according to the present invention in the point-to-multipoint data communication network shown in FIG. 1, stations (12, 14, ..., 16 and 18) determine the time to transmit their data to the network access point 10 based on the time when they receive transmission timing information from the network access point 10. For example, the stations (12, 14, ..., 16 and 18) send their own data to the network access point 10 after an offset time passes after they receive the transmission timing information from the network access point 10. The offset time is included in the transmission timing information transmitted by the network access point 10. The transmission timing information according to the present information will be described with reference to the accompanying drawings.

Figure 2:
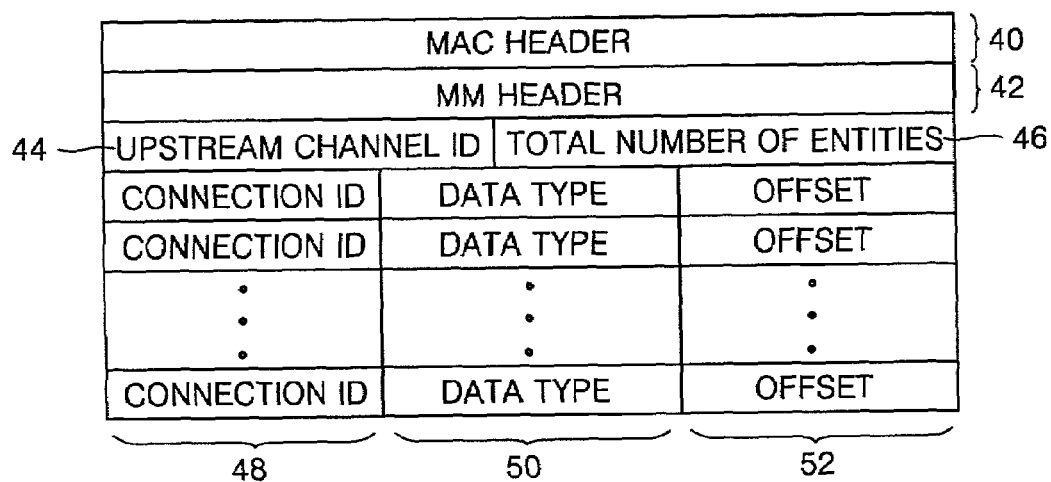
FIG. 2 shows a format of transmission timing information according to the present invention.

FIG. 2 shows a format of transmission timing information according to the present invention. The format of the transmission timing information includes a Medium Access Control (MAC) header 40, a Management Message (MM) header 42, a upstream channel ID 44, a total number 46 of entities, connection IDs 48, data types 50 and offsets 52.

Unlike the format of the conventional transmission timing information including allocation start time, the transmission timing information according to the present disclosure shown in FIG. 2 does not include the allocation start time. With reference to FIG. 2, the MAC header 40 is related to control of media access, and includes information of a source address, a destination address and a packet type, etc. If a transmission packet is not data but a message, the MM header 42 includes a message type and message-related information. Because the transmission timing information controls the transmission timing between stations (12, 14, ..., 16 and 18) sharing a specific upstream channel, the upstream channel ID 44 includes a related upstream channel ID. The total number 46 of entities indicates the total number of entities (connection ID+data type+offset). Each of the connection IDs 48 indicates an ID allocated during connection setup. Each of data types 50 indicates the format of transmission data, that is, a transmission rate or a modulation mode. Each of offsets 52 indicates an offset time.

As a result, in the method for transmitting data in the point-to-multipoint data transmission network according to the present invention, stations determine the time to transmit data through the upstream channel based on the time when they receive the transmission timing information from the network access point 10.

The method for compensating for a propagation delay in the point-to-multipoint data communication network according to the present invention will be described with reference to accompanying drawings.

Figure 3:
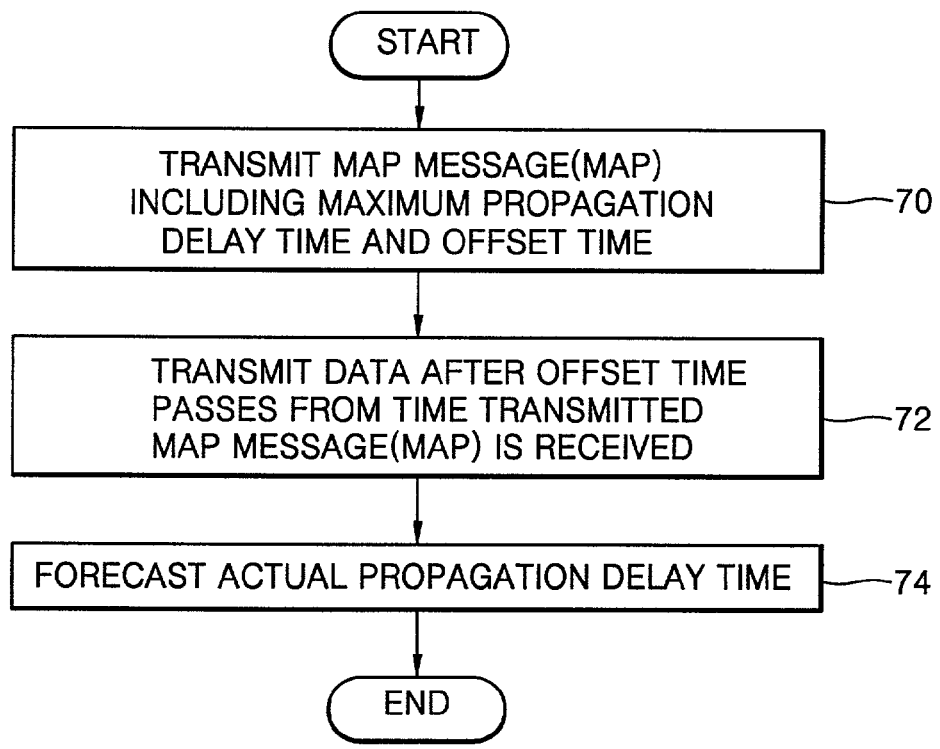
FIG. 3 is a flowchart explaining a method for compensating for a propagation delay in a point-to-multipoint data communication network according to the present invention.

FIG. 3 is a flowchart explaining a method for compensating for a propagation delay in a point-to-multipoint data communication network according to the present invention. The flowchart includes the steps of transmitting a map message (MAP), transmitting data after an offset time passes from the time the transmitted map message (MAP) is received, and forecasting an actual propagation delay time (steps 70, 72, and 74).

Figure 4:
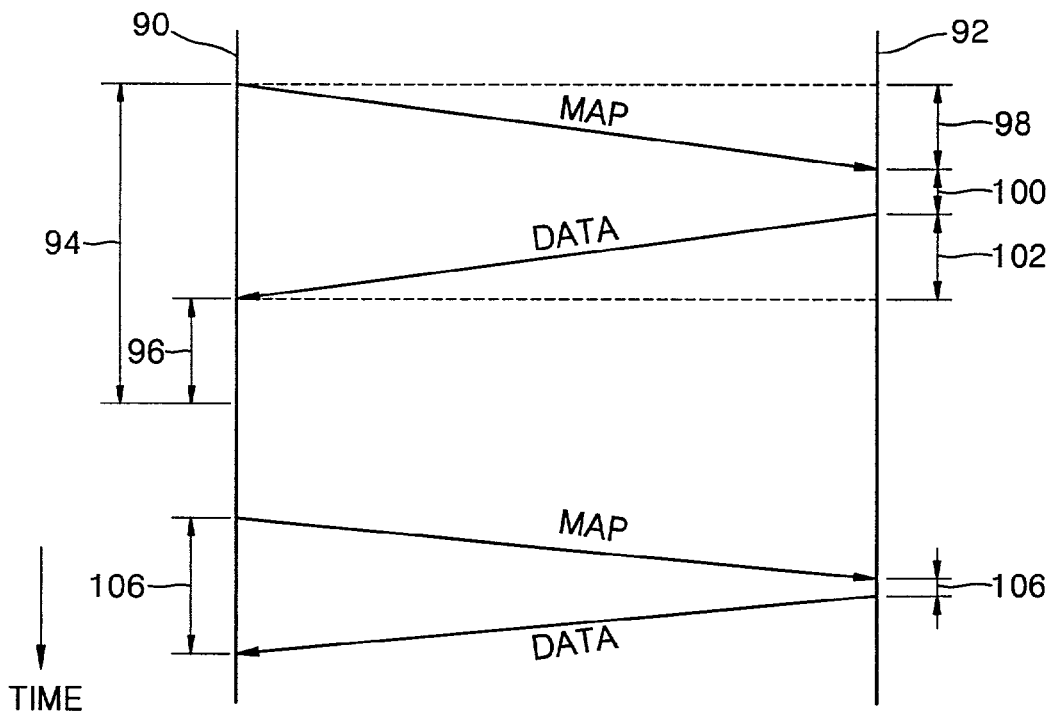
FIG. 4 shows the method for compensating for the propagation delay shown in FIG. 3.

FIG. 4 shows the method of FIG. 3 for compensating for the propagation delay between the network access point 90 and the station 92.

The propagation delay due to the distance between the network access point 10 and stations (12, 14, ..., 16 and 18) is compensated according to the present invention in the following way, rather than exchanging the ranging message according to the conventional propagation delay compensation method.

In case the transmission timing information of the upstream channel for stations (12, 14, ..., 16 or 18) that access the network and receive connection ID 48 from the network access point 10 shown in FIG. 1 is set, there is no previously measured propagation delay information. Therefore, according to the method for compensating for the propagation delay of the present disclosure, the network access point 90 transmits a map message (MAP) 94, which includes a maximum propagation delay time and an offset time, as the transmission timing information to the corresponding station 92 in step 70 as shown in FIG. 4. When the map message (MAP) is transmitted from the network acces point 90 to the station 92, the propagation delay 98 happens.

After step 70, upon receiving the map message (MAP) transmitted from the network access point 90, the station 92 waits for the offset 100 recorded in the transmission timing information shown in FIG. 2 based on time when the map message (MAP) is received, and then, transmits data to the network access point 90 in step 72. When the data is transmitted from the station 92 to the network access point 90, the propagation delay 102 happens.

After step 72, the network access point 90 forecasts an actual propagation delay time by reflecting the gap 96 between the actual time the data DATA is received from the station 92 and the expected time the data DATA is expected to be received in step 74. The forecasted delay time is a result of deduction of the gap from the maximum propagation delay time, and is used to obtain next transmission timing information. In step 74, the forecasted delay time and the offset time update the map message (MAP). In the method for compensating for the propagation delay according to the present disclosure, step 74 is performed repeatedly to continue to compensate for the propagation delay. In addition, the propagation delay caused by the movement of the station 92 can be compensated for. Then, the updated map message (MAP) 104 including the expected propagation delay time and the offset time is transmitted from the network access point 90 to the station 92. From time of receiving the updated map message (MAP), the station 92 transmits its data to the network access point 90 after the offset 106 passes.

As described above, according to the method of the present disclosure for transmitting data and compensating for the propagation delay in the point-to-multipoint data communication network, the network access point needs not broadcast the synchronization message to stations periodically in the point-to-multipoint data communication network in order to maintain and adjust the network synchronization. In addition, the network access point 10 and stations (12, 14, ..., 16 and 18) need not exchange the ranging message periodically in order to compensate for the propagation delay. Therefore, overhead can be minimized and the network utilization efficiency, that is, the data transmission efficiency can be maximized.

What is claimed is:

1. A method for transmitting data in a point-to-multipoint data communication network which includes a network access point and a first through an $N^{th}$ (N is 2 or a higher positive integer) station that communicate with each other through a shared transmission medium, the data transmission method comprising:

a station determining a time to transmit data to the network access point based on a time when the station receives transmission timing information from the network access point, wherein the transmission timing information includes offset time information for the first through $N^{th}$ stations.

2. The method of claim 1, further comprising:
the station sending the data to the network access point after the offset time for the station passes from the time the station receives the transmission timing information.

3. The method of claim 1, wherein the transmission timing information does not include an allocation start time.

4. In a point-to-multipoint data communication network which includes a network access point and a first through an $N^{th}$ (N is 2 or a higher positive integer) station that communicate with each other through a shared transmission medium, a propagation delay compensation method in case transmission timing information of an upstream channel for a station that receives a connection ID from the network access point is set comprising:
   (a) transmitting a map message, which includes a maximum propagation delay time and an offset time, as the transmission timing information;
   (b) transmitting data after the offset time passes from a time the transmitted map message is received; and
   (c) forecasting an actual propagation delay time by reflecting a gap between an actual time the transmitted data is received and an expected time the transmitted data is expected to be received,
wherein the forecasted delay time and the offset time update the map message.

5. The method of claim 4, wherein step (c) is performed repeatedly.

6. A method for transmitting data in a point-to-multipoint data communication network which includes a network access point and a first through an $N^{th}$ (N is 2 or a higher positive integer) station that communicate with each other through a shared transmission medium, the data transmission method the comprising:
   a station determining a time to transmit its data to the network access point based on a time when the station receives transmission timing information from the network access point without the need for at least one of (1) synchronizing the stations with the network access point and (2) exchanging a ranging message between the network access point and the stations, wherein the transmission timing information includes offset time information for the first through $N^{th}$ stations.

7. The method of claim 6, further comprising: the station sending the data to the network access point after the offset time for the station passes from the time the station receives the transmission timing information.

8. The method of claim 6, wherein the transmission timing information does not include an allocation start time.

* * * * *